United States Patent
Brask et al.

[11] Patent Number: 5,993,118
[45] Date of Patent: Nov. 30, 1999

[54] TOOL FOR GROOVING AND PARTING METHOD OF MANUFACTURING SAME

[75] Inventors: Karl-Göran Brask, Sandviken; Per Hansson, Gävle, both of Sweden

[73] Assignee: Sandvik Aktieboalg, Sandviken, Sweden

[21] Appl. No.: 09/049,004

[22] Filed: Mar. 27, 1998

[30] Foreign Application Priority Data

Mar. 27, 1997 [SE] Sweden ................................. 9701134
Mar. 27, 1997 [SE] Sweden ................................. 9701135

[51] Int. Cl.$^6$ ....................................................... B23B 5/14
[52] U.S. Cl. ........................ 407/110; 407/112; 407/113; 407/108
[58] Field of Search ..................................... 407/110, 109, 407/108, 107, 112, 113; 82/161

[56] References Cited

U.S. PATENT DOCUMENTS

| | | | |
|---|---|---|---|
| 3,497,935 | 3/1970 | Bowling | 407/108 |
| 3,505,715 | 4/1970 | Germani | 407/108 |
| 3,551,977 | 1/1971 | Novkov | 407/113 X |
| 4,195,956 | 4/1980 | Mihic | 407/108 |
| 4,588,333 | 5/1986 | Gustafson . | |
| 4,744,703 | 5/1988 | Cochran | 407/112 X |
| 4,801,224 | 1/1989 | Pettersson et al. | 407/110 |
| 5,022,796 | 6/1991 | Pano et al. . | |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A metal-cutting tool comprises a holder, a clamp, and a metal-cutting insert. The holder includes a blade part which forms an upwardly facing seating surface extending in a front-to-rear direction. The holder includes a recess including a longitudinal axis extending in the front-to-rear direction at an angle relative to the seating surface, whereby an imaginary rearward extension of the seating surface converges toward the axis. The insert is mounted on the seating surface and the clamp has a rear portion which is slidable within the recess, whereby a front portion of the clamp pushes downwardly and rearwardly against a top surface of the insert. That top surface is shaped so that the front portion of the clamp is flexed upwardly relative to the rear portion when the rear portion is pushed rearwardly to the clamping position.

15 Claims, 8 Drawing Sheets

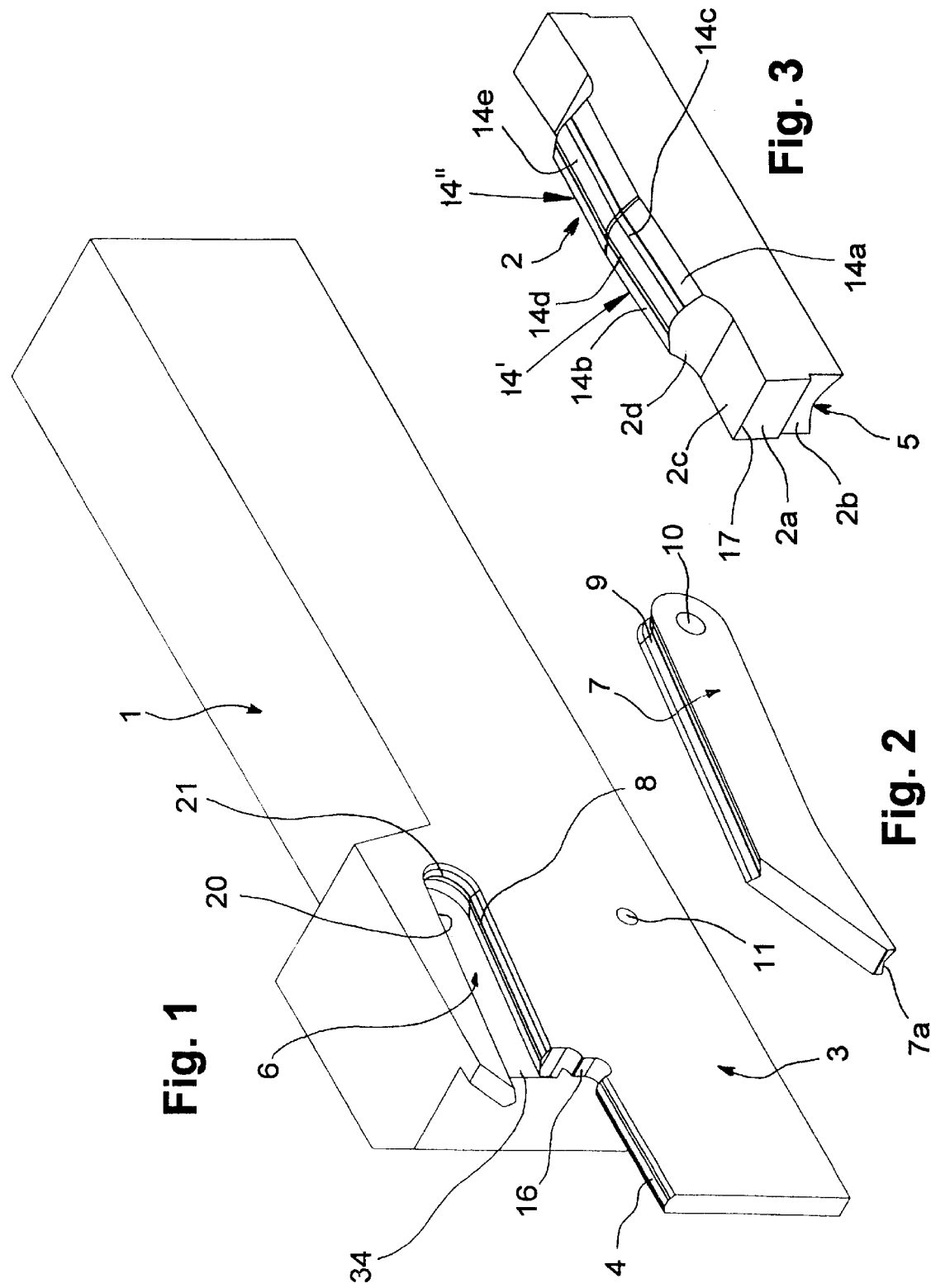

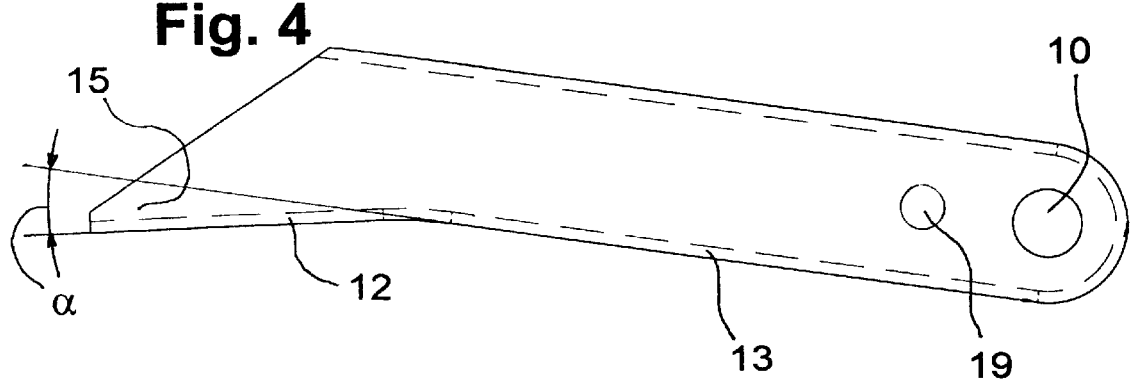
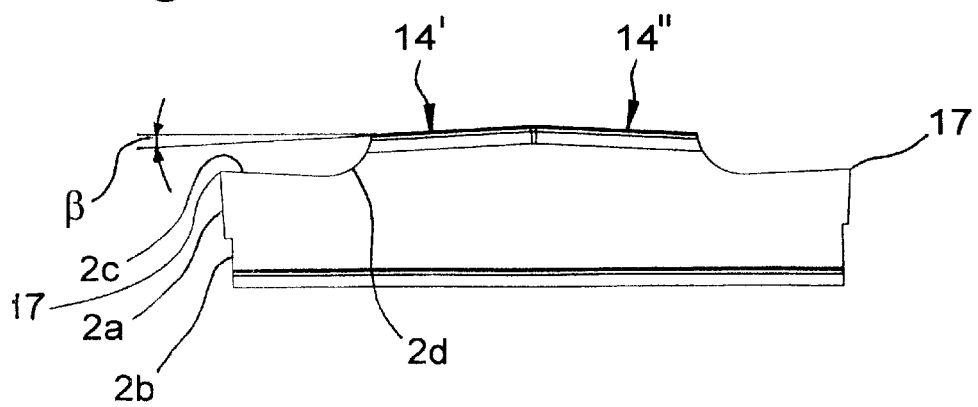

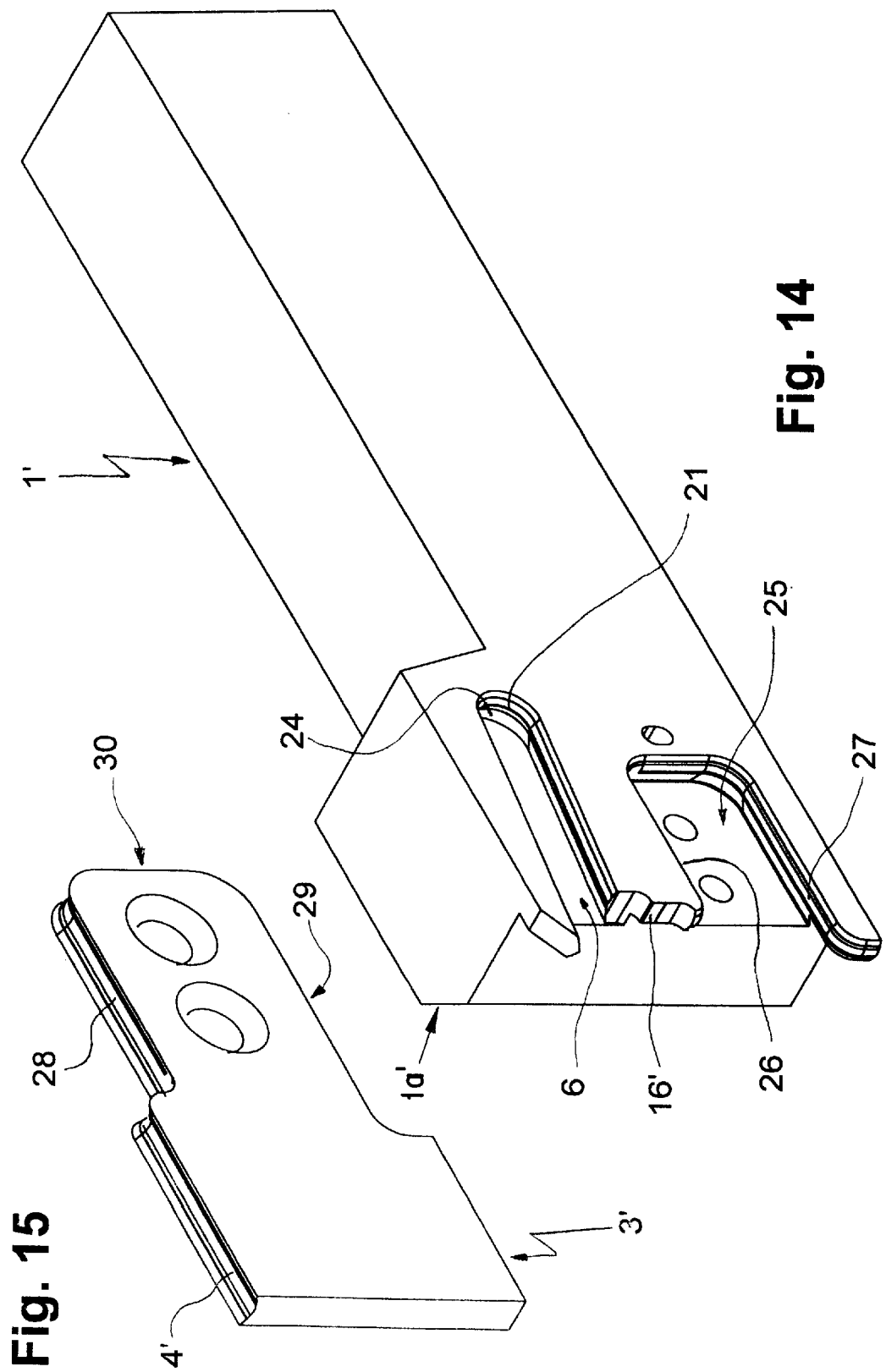

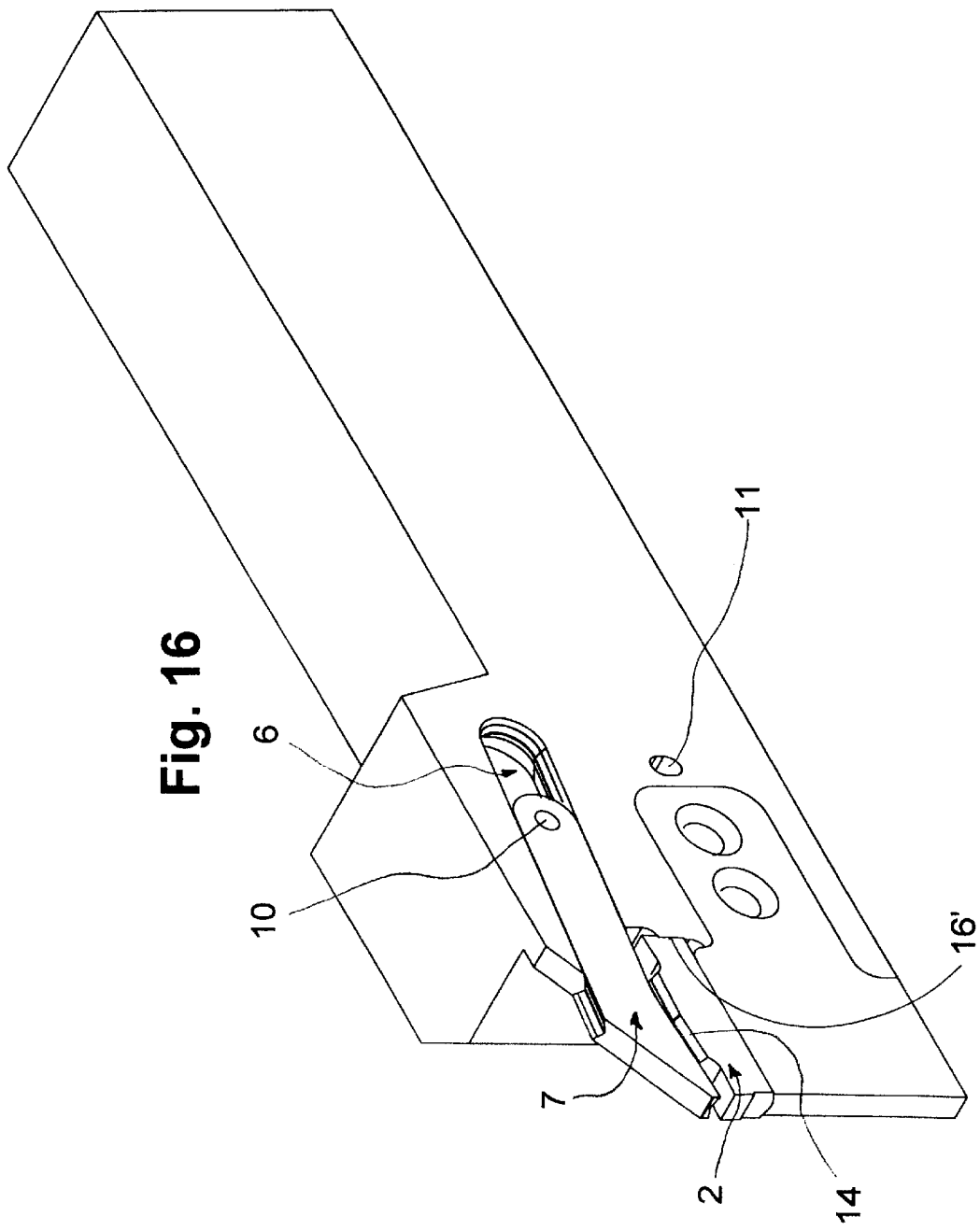

TOOL FOR GROOVING AND PARTING METHOD OF MANUFACTURING SAME

BACKGROUND OF THE INVENTION

The present invention concerns a tool for grooving and parting and means for manufacturing same.

Cutting inserts for grooving and parting for example, are, in order to achieve narrow widths of cut, clamped in tool holders of the blade type. The term "blade type" even includes slitting cutters and circular saw blades.

U.S. Pat. No. 4,801,224 illustrates a clamping device for a cutting insert in a holder of the blade type is described, including a cutting insert which can be clamped in a slot in the blade. The cutting insert is clamped by a spring action created by deflection of a clamping finger which is an integral part of the holder. In order to press the cutting insert into its correct position in the slot, a special installation tool is used which consists of a rod with two pins in one end surface. This device functions satisfactorily but it nevertheless suffers from certain drawbacks. For example, the fact that the cutting insert itself forces the spring clamp finger upwards each time a cutting insert is mounted, causes a certain frictional wear of the contact surfaces of the clamping finger which engage the cutting insert. That wear, over a long period, damages the contact surfaces, such that the cutting insert no longer sits with the same stability which it had at the beginning. Therefore the entire the blade holder must be exchanged.

Also, in U.S. Pat. No. 4,588,333 a clamping device in a blade holder is described, according to which the cutting insert is clamped in a slot by spring action which is created by the deflection of a clamping finger which is integrated into the blade holder. According to this design the cutting insert is pressed into the insert pocket by the operator, who pushes the end surface of a hard rod or bar against the front part of the cutting insert. In a manner similar to that in U.S. Pat. No. 4,801,224 the cutting insert is then prized out by applying one of the two pins on the said rod behind the cutting insert and levering it out. Even with this design the contact surface of the holder, which acts against the cutting insert, wears each time a cutting insert is inserted or extracted. Further, even in this case, there is the inconvenience that the installation tool requires space.

EPO 0 259 847 illustrates a blade holder with a slot for receiving the cutting insert is described, plus an additional slot for the mounting of a clamping screw, which when activated forces the blade part disposed between said two slots and presses it against the cutting insert, whereby the insert is clamped. Also here a certain wear occurs when installing the cutting insert into and removing the cutting insert from the slot in which the insert is to sit. Furthermore the clamping screw can cause certain problems, by limiting the amount of play and giving inadequate clamping force.

In U.S. Pat. No. 4,195,956 a parting tool with an exchangeable cutting insert is described, the design of said cutting insert is such that the insert can be clamped between two narrow jaws at the forward end of the blade holder which are positioned one exactly above the other. The upper jaw consists of a loose part which can be inserted into a recess in the holder and which is restrained from sideways movement. That upper part is arranged to be fixed in its position in the recess exclusively through the clamping effect created between the jaws and the clamped cutting insert. This clamping effect is brought about by the cutting forces which act on the cutting insert, which are taken up entirely by the jaws. Furthermore the upper jaw has an abutment for the rear surface of the cutting insert, whereby the cutting insert is clamped by pressing the cutting insert inwards into the insert pocket, whereby also the upper jaw is pushed rearwards and thereby the cutting insert is firmly clamped. This, however, results in the cutting edge not getting the well-defined radial positional accuracy which is desired. The cutting insert can therefore loosen when exposed to vibration. Further the different cross sections of the upper jaw (dovetail to the rear, edges with V-profile at the front) entail a complicated and inexact machining process.

Even U.S. Pat. No. 3,505,715 describes a tool for parting and the turning of grooves, which includes a loose clamp with which the insert is clamped. This clamp, however, has an inverted profile on its upper-respectively lower sides, which complicates manufacture of both the loose clamp and the slot for the clamp.

The prime purposes of the present invention are consequently to avoid costly changing of the complete holder and to simplify manufacture of a blade holder with a loose clamp.

Another purpose of the present invention is to develop a blade holder with a loose clamp, whereby two clamps which retain the insert are positioned in exactly the same plane, without risk of them becoming angularly displaced, in order to obtain a secure and rigid clamping with consistent positioning of the cutting edge particularly in the axial direction.

SUMMARY OF THE INVENTION

These and other objects have been successfully achieved by a metal-cutting tool comprising a holder, a clamp, and a metal-cutting insert. The holder includes a blade part forming an upwardly facing seating surface which extends in a front-to-rear direction. The holder further includes a recess which has a longitudinal axis extending in a front-to-rear direction at an angle relative to the seating surface, whereby an imaginary rearward extension of the seating surface converges toward the axis. The clamp includes front and rear portions. The rear portion is slidable within the recess along the axis between a rear clamping position and a front releasing position. The front portion includes a downwardly facing clamping surface which overlies the seating surface. The metal-cutting insert includes a bottom surface seated on the seating surface and also includes a top surface portion engaged by the clamping surface top be clamped against the seating surface when the rear portion of the clamp is in the rear clamping position. The top surface is oriented relative to the clamp such that the front portion of the clamp is flexed upwardly relative to the mounting portion by the top surface when the mounting portion is pushed rearwardly to the rear clamping position.

The present invention also relates to the method of mounting the metal-cutting insert as described above.

The invention also pertains to a holder adapted to support a metal-cutting insert. The holder comprises a blade part forming an upwardly facing seating surface adapted to support a cutting insert. The holder further includes a recess extending rearwardly relative to the seating surface. The recess includes a guide surface adapted to guide a rear portion of an insert-clamping element. The seating surface and guide surface are non-planar when viewed in cross section.

The invention also relates to a method of manufacturing a holder and a clamp of a metal-cutting tool. The method comprises the steps of:

A) machining an upwardly facing seating surface in a blade part of a holder by a profile milling cutter, whereby the seating surface extends in a front-to-rear direction and is adapted to support a metal-cutting insert;

B) machining a recess in the holder by the same profile milling cutting as used in step A, whereby the recess has a longitudinal axis extending in the front-to-rear direction at an angle relative to the seating surface, whereby an imaginary rearward extension of the seating surface converges towards the axis; and C) providing a clamp including front and rear portions, the rear portion being slidable within the recess along the axis between a rear clamping position and a front releasing position, the front portion including a downwardly facing clamping surface overlying the seating surface and adapted to clamp a cutting insert to the blade.

The invention also pertains to a metal-cutting insert comprising a prismatic body elongated between first and second ends thereof. The body includes a bottom surface extending between the first and second ends, and a top surface extending between the first and second ends. The top surface forms cutting edges at respective ones of the ends. The top surface includes first and second surface portions extending in opposite directions toward a center of the top surface while diverging with respect to the bottom surface. Each of the first and second surface portions has a generally V-shaped cross section pointing away from the bottom surface.

BRIEF DESCRIPTION OF THE DRAWING

In order to illustrate but not limit the invention preferred embodiments thereof will now be described in detail with reference to the attached drawings. These are presented in brief herewith:

FIG. 1 shows an insert holder of the blade type in accordance with the invention, in perspective obliquely from above.

FIG. 2 shows a loose clamp according to the invention in perspective obliquely from above.

FIG. 3 shows a cutting insert adapted to the invention, in perspective obliquely from above.

FIG. 4 shows the loose clamp according to FIG. 2, straight from the side.

FIG. 5 shows the cutting insert according to FIG. 3, straight from the side.

FIG. 14 shows a second embodiment of a blade holder, in perspective obliquely from above.

FIG. 15 shows a blade element for use in the FIG. 14 holder, in perspective obliquely from above.

FIG. 16 shows an assembled tool according to the second embodiment, in perspective obliquely from above.

DETAILED DESCRIPTION OF THE PREFERRED EMBODIMENTS

Figure 8:
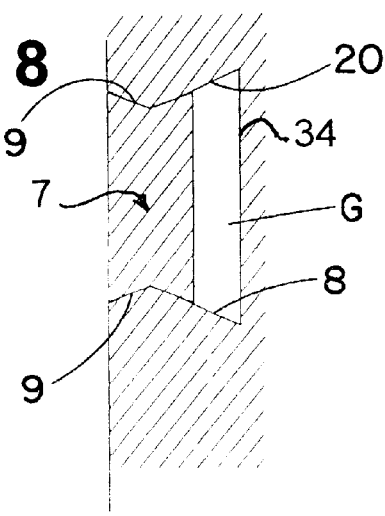
FIG. 8 shows a section VI—VI in FIG. 7.
Figure 9:
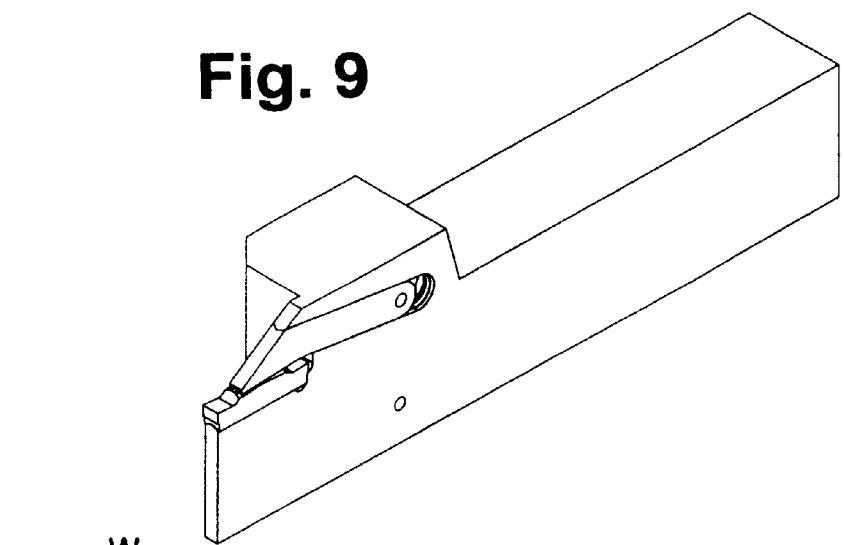
FIG. 9 shows a completely installed cutting insert in a tool according to the invention, in perspective obliquely from above.
Figure 10:
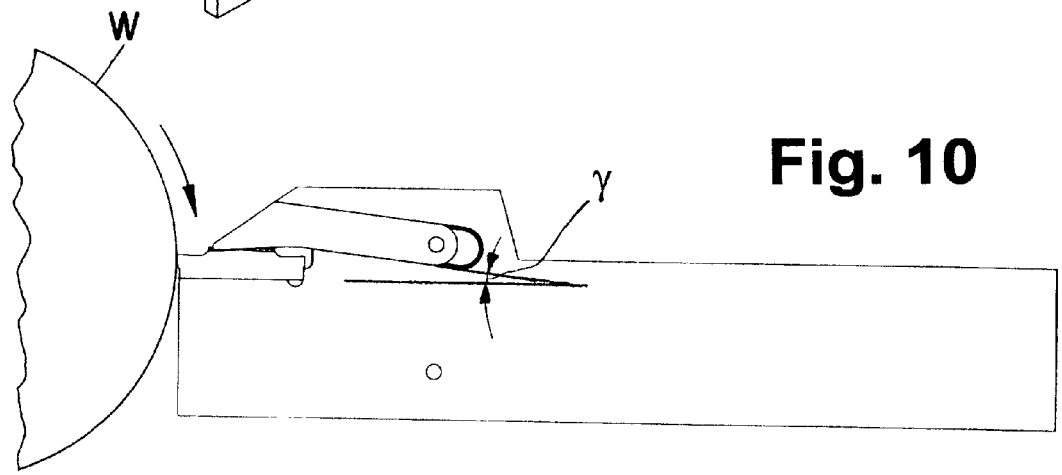
FIG. 10 shows the tool according to FIG. 9 straight from the side.

FIG. 1 shows, in general, a holder 1 for the installation of cutting insert 2 (FIG. 3), the cutting insert intended for grooving and/or parting of a workpiece W (see FIG. 10). In order to make possible the cutting depths intended, the holder 1 is equipped at the front end with an integral blade part 3, which is sufficiently narrow to be inserted into the turned groove. An upwardly facing abutment or seating surface 4 is provided on the upper surface of the blade part for abutment surface against a lower abutment surface or bottom surface 5 of the cutting insert 2. In order to lock the cutting insert in the axial direction of the workpiece W (i.e., in a direction perpendicular to the blade part 3), the surfaces 4 and 5 are designed with retaining profiles of ridges and grooves, e.g., a profile of V-shape or in the form of a segment of a circle. The insert should be suitably positioned radially of the workpiece (i.e., left-to-right in FIG. 10) so that the rear end of the insert rests against the contact surface 16. Further the holder 1 is equipped with a recess 6, suitably in the wider part of the holder, radially behind the blade part 3. This recess is intended to receive a loose clamp 7 (FIG. 2). The recess features two substantially parallel side surfaces or guide surfaces, i.e., one upper side or guide surface 20 and one lower side or guide surface 8. The rear of these two surfaces 20, 8 are suitably linked by a substantially semicircular end surface 21. The end surface 21 can however be given other forms. It can for example be straight and perpendicular relative to the side surfaces 20 and 8. The recess features a side surface 34. The recess 6 and the loose clamp 7 are provided with interacting profiled side surfaces 8 and 9, respectively, in order to lock and retain the loose clamp in the axial direction of the workpiece, as well as to guide the loose clamp 7 in and out of the recess 6 in a radial direction of the workpiece (i.e., along a longitudinal axis of the recess 6). This can be clearly seen in the cross section in FIG. 8. In a similar way to the surfaces 4 and 5, the surfaces 8 and 9 can also be designed with, for example, a cross section with a mainly V-shape or in the form of a segment of a circle. In order to facilitate the displacement of the loose clamp into the recess 6, the loose clamp can be equipped with a transverse hole 10 and the holder with a hole 11. Two pins which are mounted on the shaft of a lever tool (not shown) are then introduced into these holes for pushing the clamp in place.

From FIG. 4 it can be seen that the underside of the loose clamp is divided into two essentially straight outer edge parts which are angled relative to each other, namely a forward pressure or clamping part 12, which includes a downwardly facing clamping surface 12a intended to abut against the top of the cutting insert, and a rear displacement mounting part 13, intended to slide within the recess 6. An angle α between the extension of the displacement part 13 and the pressure part 12 is suitably between 5 and 15°.

The pressure part 12 abuts against the top of the cutting insert 2, more exactly against one of two abutment surface portions 14', and 14", each of which is slightly angled relative to the bottom surface 5 of the cutting insert by an angle β suitably between 1 and 7° (see FIG. 5). When the insert has been installed, the pressure part 12 should be either parallel to the respective abutment surface 14' or 14", or slightly angled relative thereto whereby substantially only the tip part 15 of the loose clamp is brought into contact with the abutment surface 14' or 14". The angle between the surfaces 12 and 14' (or 14") should thus suitably lie between 0 and 10°.

Figure 19:
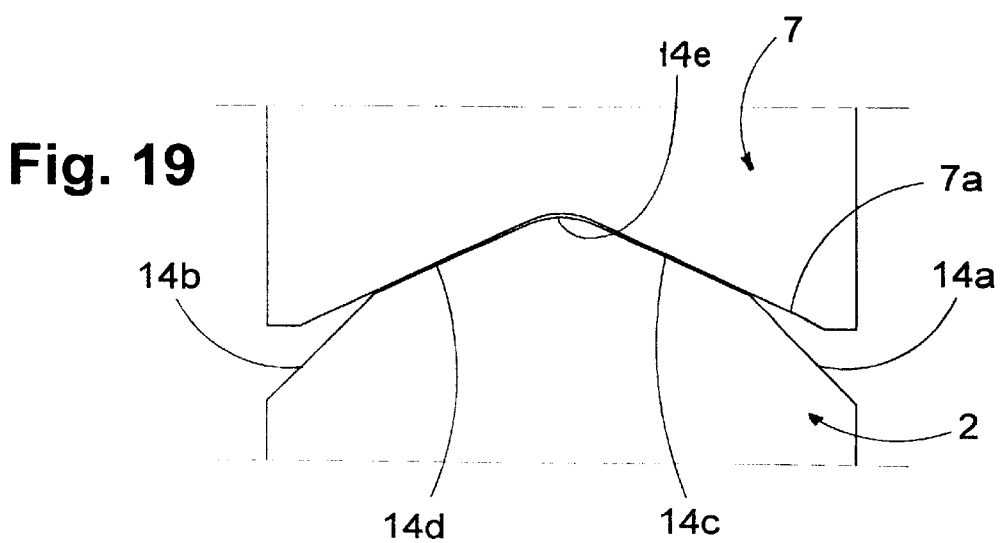
FIG. 19 shows the section IXX—IXX from FIG. 17.

Each of the surface portions 14', 14" includes a pair of upper flank surfaces 14c, 14d (see FIG. 19) diverging downwardly to form a first angle between one another, and a pair of lower flank surfaces 14a, 14b diverging downwardly from the surfaces 14c, 14d, respectively, and forming a second angle between one another which is smaller than the first angle. The surfaces 14c, 14d converge upwardly toward a convexly curved surface 14e having a radius of curvature.

The insert 2 includes at each end therof, an upright surface including upper and lower portions 2a and 2b, the lower portion being recessed rearwardly with respect to the upper portion (see FIG. 5). At each end the cutting insert includes the cutting edge 17, a chip surface 2c extending from the cutting edge toward a center of the top surface, and a transition surface 2d extending upwardly from a rear end of the chip surface to a respective one of the surface portions 14', 14".

Figure 6:
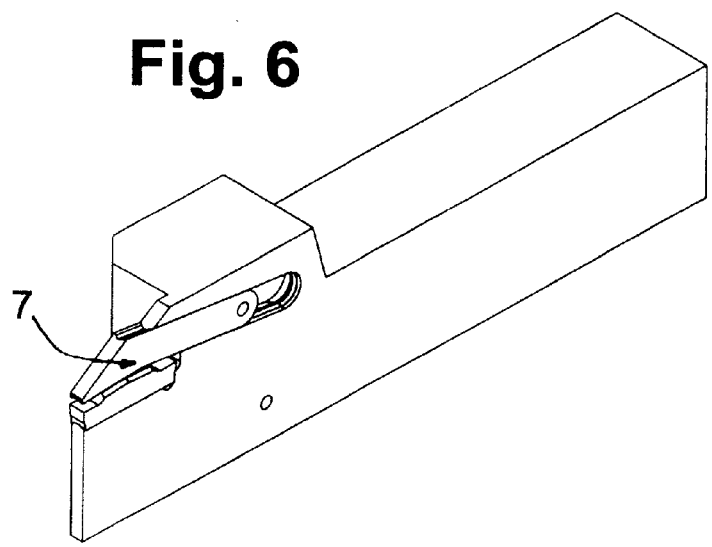
FIG. 6 shows an initial phase of the installation of a cutting insert in a tool according to the invention, in perspective obliquely from above.
Figure 7:
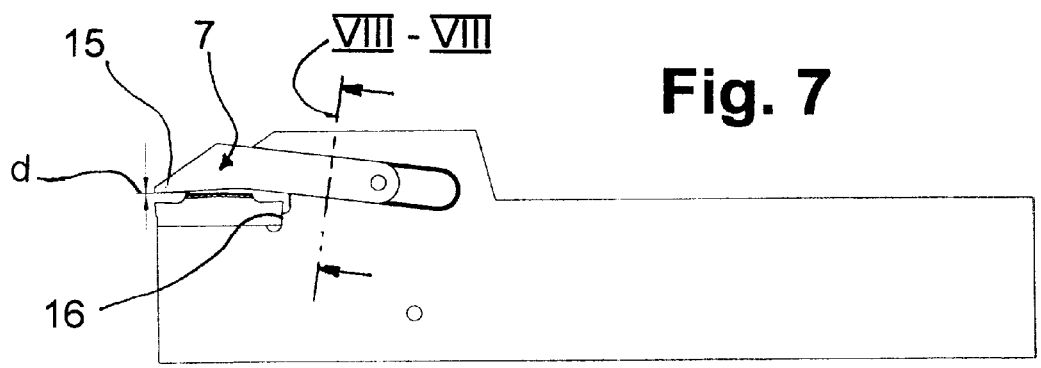
FIG. 7 shows the tool according to FIG. 6 straight from the side.

FIGS. 6 and 7 show the position of the loose clamp 7 at the beginning of the installation of the insert. Under these circumstances the loose clamp is drawn out from the recess 6 so far that the cutting insert is spaced below the tip part 15 by an infinitesimal distance d, whereafter the cutting insert is pushed into abutment against the inner abutment surface 16. Subsequently the loose clamp 7 is displaced backwards-downwards into the recess 6, preferably with help of the above mentioned installation tool, until the cutting insert is sufficiently rigidly clamped. During the entire clamping operation the cutting insert is naturally also biased backwards against the abutment surface 16, whereby the cutting insert will be exactly positioned, in contrast, for example, to devices according to the above mentioned U.S. Pat. No. 4,195,956. The effect of the cutting insert being pushed backwards into the insert pocket is further accentuated by the abutment surface 14' (or 14") being angled by the angle β, which produces a backward force component directed towards the abutment surface 16. The angle γ is the angle between the longitudinal direction of the recess 6 and the abutment surface 14' (or 14") (see FIG.10). This angle should suitably lie within the range of 2–°. The angle should be small enough to be self restricting when extracting the loose clamp, but it can also be larger. In the latter case the clamp must in some way or other be retained in its clamping position, which can be achieved in a number of ways. A simple means of locking the loose clamp in a certain position is to provide it with a threaded hole 19 (FIG. 4) and thread a pin having a sharp tip into this hole, which pin can be brought to press against the side surface 34 of the recess 6.

An important characteristic of the present invention is that the clamping force which the loose clamp exerts on the cutting insert, increases (preferably progressively) when the loose clamp 7 is displaced backwards, deeper into the recess 6. This is caused by the tip part 15 being flexed upwardly relative to the rear portion 13 by the abutment surface 14' (or 14") simultaneously as the loose clamp moves partially downwards because of the inclination of the recess 6. Thus, as the clamping surface 12a flexes, it pushes harder against the insert, whereby a very secure and rigid clamping is obtained and the risk that the cutting insert may loosen because of vibration is practically eliminated. Further, full clamping is obtained with a shorter displacement of the loose clamp. In addition the cutting insert is clamped radially, i.e. toward the right in FIG. 7, since the tip part 15 extends farther down than the highest point of the cutting insert.

Also, when releasing the cutting insert there are clear advantages regarding rapidity. Consequently the displacement of the loose clamp in the direction towards the operational cutting edge 17 entails a very quick, almost instantaneous, loosening of the cutting insert.

Figure 11:
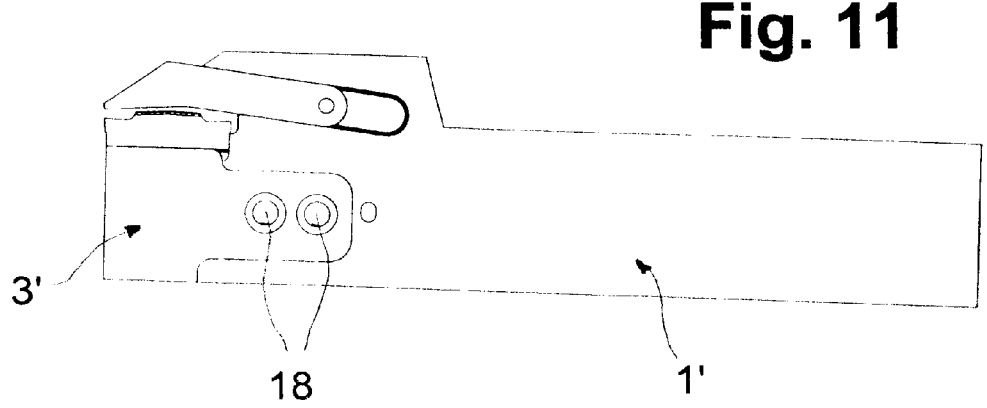
FIG. 11 shows another embodiment of the tool according to the invention, straight from the side.
Figure 12:
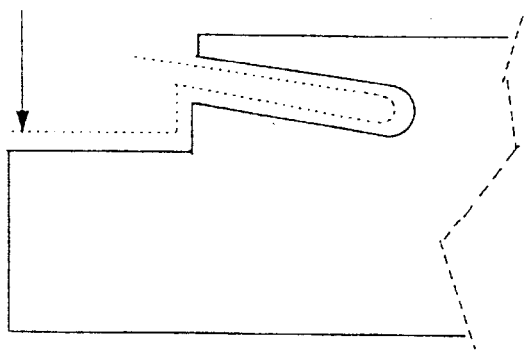
FIG. 12 shows a stylized view of a blade holder straight from the side.

According to another embodiment of the invention, the blade part of the holder can be made as a separate blade part 3', in accordance with FIG. 11. This blade part can be fixed firmly by, for example, two screws or bolts in holder 1'. This leads to the advantage that only the blade part 3' needs to be exchanged, if this part should be damaged, for example when an insert breaks up. In this case the contact edges of the blade part 3' and holder 1' can have the same cross-sectional profile as the contact edges of the loose clamp 7 and the recess 6. This leads to the advantage that the recess in holder 1' for the blade part 3' as well as the recess 6 can be produced in one and the same machining operation by the same milling tool. Furthermore, the loose clamp and the edge profile of the blade part 3', each of which is intended to abut a recess of the holder 1', can be produced in one and the same machining operation with the same profile milling tool. This profile cutter can take the form of an endmill with the required profile. In addition, this machining can be carried out to advantage in one and the same pass of the endmill, as illustrated in FIG. 12. Hence the profiles of the side surfaces 8 and 20 end up in the same plane as the contact surface 4 which is a considerable advantage.

Figure 13:
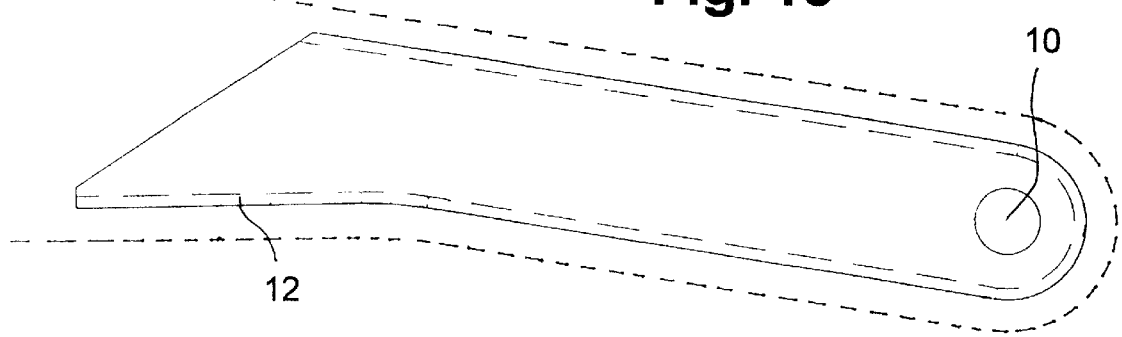
FIG. 13 shows a loose clamp according to FIG. 2 straight from the side.

Even the loose clamp 7 can be machined with one and the same profile cutter, and once again with the advantage that it can be machined in the same tool path, as illustrated by the dashed line 23 in FIG. 13. This profile cutter has a profile which is inverted in relation to the profile cutter which is used for cutting path 22. Hence, by necessity, the contact surface 12 of the loose clamp 7 which meets the upper surface of an installed cutting insert will end up in exactly the same plane as the lower contact surface 4. In this manner the clamping force of the clamping loose clamp will always act exactly symmetrically on the insert, whereby the risk for angular errors and crookedness is practically eliminated.

It is best if a gap G is formed between the loose clamp 7 and the side surface 34 of the recess (see FIG. 8), so that the clamp moves freely on each flat side. This is achieved by including in the profile cutter a cylindrical part to create the link surface 21 between the side surfaces 8 and 20 and the bottom surface 34.

According to the figures, the surfaces 4, 8 and 20 present a substantially V-shaped rib profile and the loose clamp presents equivalent substantially V-shaped groove profiles. This can however be reversed, so that surfaces 4, 8 and 20 are arranged with V-shaped grooves and the loose clamp with a V-shaped rib. At the same time, naturally, even the contact surfaces of the insert to be installed must be reversed.

As shown in FIG. 14, the holder 1' includes a base 1a' having a recess 25 designed to receive a separate blade part. This recess features edge surfaces 26, 27 which are formed with axial retaining cross sectional profiles, in a manner similar to the recess 6. Therefore, the method of production which is included in this invention is utilized in a very advantageous manner: first one of the recesses 6, 25 is milled preferably in a single cutting path with one and the same milling tool and subsequently the other recess is milled. Even the contact surface 16' and the end surface 21 may be milled with the same profile cutter. Further the loose clamp 7 and the blade part 3' can be milled with one and the same milling tool, preferably in one and the same cutting path. Thereby the insert contact surface 4' of the blade part 3', the guide surfaces 28, 29 plus possibly the end surface 30 are given the same profile. Naturally even the embodiments shown in FIGS. 14, 15 can be modified in such a way, that all the V-shaped profiles (or other suitable profiles) are inverted. According to this embodiment the advantage that the profiles of the side surfaces in recess 6 end up in exactly the same plane as the contact surface 4' is again achieved.

FIG. 16 shows an assembled tool according to FIGS. 14, 15, with an insert being installed. The insert has been pressed in backwards until it is in contact with the contact surface 16'. The loose clamp 7 is still seen in a forward position, at which the insert 2 is free from the loose clamp and can be pushed in. Afterwards the loose clamp is pushed backwards, into the recess 6, until the contact surface 12 of the loose clamp presses against the upper surface of the insert 2. The displacement of the loose clamp is facilitated through the use of a lever tool fitted with two pins, whereby the one pin is fed into a transverse hole 10 in the loose clamp, and the other pin is fed into a blind hole 11 in the holder.

Figure 17:
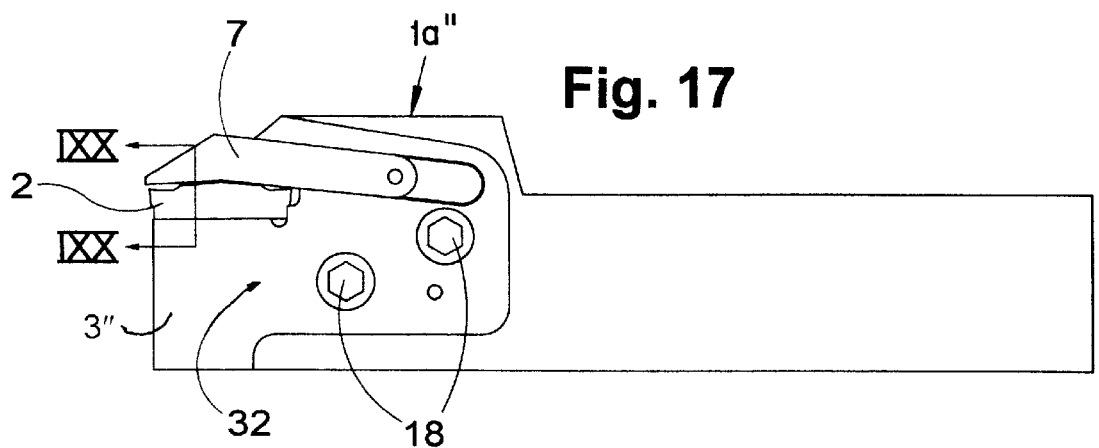
FIG. 17 shows a further embodiment of the invention, straight from the side.
Figure 18:
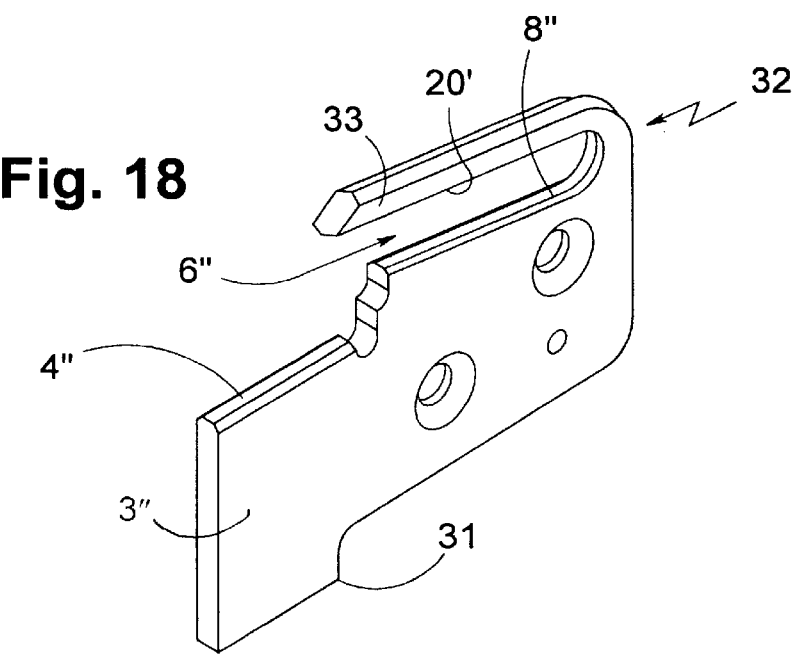
FIG. 18 shows the holding element for the embodiment of the invention according to FIG. 17, in perspective obliquely from above.

FIGS. 17 and 18 illustrate a further embodiment according to the invention. Wherein a holding element 32 is arranged, which is designed to receive both the loose clamp 7 and the insert 2. The holding element is best screwed to the base 1a" of the holder, for example with two bolts or screws 18. All parts of the contour of the holding element, which come into contact with the holder, that is to say from the forward part of the upper side of the upper blade 33 to the point 31, plus even the side surfaces 20' and 8" of the recess 6" and the contact surface 4", are machined to one and the same profile with one and the same profile milling cutter, preferably following one and the same cutting path. According to FIG.18 this profile is mainly formed as a V-shaped rib. In this manner all the rib profiles will end up in exactly the same plane. The loose clamp 7 is machined with a profile milling tool which is inverted compared to the named tool in the same way as described under the reference to FIG. 13, with a substantially V-shaped groove which fits into the profile of the side surfaces 20', 8". Thereby the advantage that the groove in the loose clamp which is turned towards the insert and the rib of the contact surface 4" end up in exactly the same plane is achieved. If so desired, a gap can be arranged between the holding element 32 and the holder.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A metal-cutting tool comprising:
a holder including a blade part forming an upwardly facing seating surface extending in a front-to-rear direction, the holder further including a recess having a longitudinal axis extending in the front-to-rear direction at an angle relative to the seating surface, whereby an imaginary rearward extension of the seating surface converges toward the axis;
a clamp including front and rear portions, the rear portion being slidable within the recess along the axis between a rear clamping position and a front releasing position, the front portion including a downwardly facing clamping surface overlying the seating surface; and
a metal-cutting insert including a bottom surface seated on the seating surface and a top surface portion defining an abutment surface engaged by the clamping surface and clamped thereby against the seating surface when the rear portion of the clamp is in the rear clamping position, the top surface being oriented relative to the clamp such that the front portion of the clamp is flexed upwardly relative to the rear portion by the top surface when the rear portion is pushed rearwardly to the rear clamping position, the abutment surface being inclined at an acute angle with respect to the bottom surface such that the abutment surface diverges from the bottom surface in a rearward direction.

2. The tool according to claim 1 wherein the top surface of the insert is oriented relative to the clamp such that the upward flexing of the front portion occurs progressively as the clamp is pushed rearwardly.

3. The tool according to claim 1 wherein the recess and the rear portion of the clamp are provided with mutually engaging surfaces configured to prevent movement of the rear portion relative to the recess in a direction perpendicular to a plane of the blade.

4. The tool according to claim 2 wherein one of the mutually engaging abutment surface and clamping surface extends into the other as viewed in cross section.

5. The tool according to claim 1 wherein the blade part includes a wall forming a side surface of the recess, the rear portion of the clamp including a hole enabling a fastener to extend through the hole and into the side surface, for securing the clamp in place.

6. The tool according to claim 1 wherein the rear portion of the clamp includes a downwardly facing surface extending rearwardly and downwardly relative to the clamping surface.

7. The tool according to claim 1 wherein the holder includes a base in which the recess is formed, the blade part being of integral one-piece construction with the base.

8. The tool according to claim 1 wherein the holder includes a base in which the recess is formed, the blade part being separate from the base and attached thereto by a releasable fastener.

9. The tool according to claim 1 wherein the holder includes a base, the blade part being separate from the base and attached thereto by a releasable fastener, the recess being formed in the blade part.

10. A holder adapted to support a metal-cutting insert, the holder comprising a blade part forming an upwardly facing seating surface adapted to support a cutting insert, the holder further including a recess extending rearwardly relative to the seating surface, the recess including a guide surface adapted to guide a rear portion of an insert-clamping element, the seating surface and guide surface being non-planar when viewed in cross section, wherein the seating surface and the guide surface have identical non-planar shapes when viewed in cross section, wherein the recess constitutes a first recess; the holder including a base having formed therein a second recess, the blade part being mounted in the second recess and secured therein by a releasable fastener, wherein the first and second recesses are formed by first and second surfaces, respectively, which are identically shaped in cross section.

11. The holder according to claim 10 wherein the first recess is formed in the base.

12. The holder according to claim 10 wherein the first recess is formed in the blade part.

13. A metal-cutting insert comprising a prismatic body being elongated between first and second ends thereof, the body including a bottom surface extending between the first and second ends, and a top surface extending between the first and second ends, the top surface forming cutting edges at respective ones of the ends, chip surfaces extending rearwardly from respective cutting edges toward a center of the top surface, and transition surfaces extending upwardly from a rear end of respective chip surfaces, the top surface further including first and second surface portions extending in opposite directions from the upper ends of respective ones of the transition surfaces toward the center of the top surface in diverging relationship with the bottom surface, each of the first and second surface portions having a generally V-shaped cross section pointing away from the bottom surface.

14. The metal-cutting insert according to claim 13 wherein each of the generally V-shaped surface portions comprises a pair of upper flank surfaces diverging downwardly to form a first angle between one another, and a pair of lower flank surfaces diverging downwardly from respective ones of the upper flank surfaces and forming a second angle between one another, the second angle being smaller than the first angle.

15. The cutting insert according to claim 13 wherein the upper flank surfaces converge upwardly toward a convexly curved surface having a radius of curvature.

* * * * *